July 9, 1963

G. E. PATTON 3,096,766

SANITARY BELT

Filed June 1, 1962

INVENTOR.
GEORGE E. PATTON
BY
Bean, Brooks, Buckley&Bean
ATTORNEYS

United States Patent Office 3,096,766
Patented July 9, 1963

3,096,766
SANITARY BELT
George E. Patton, 12 Liddell St., Buffalo, N.Y.
Filed June 1, 1962, Ser. No. 199,296
2 Claims. (Cl. 128—289)

This invention relates to improvements in belts of the type used for supporting catamenial pads and, more specifically, the present invention is concerned with certain attachments or additions to such belts which give rise to greater comfort for the user.

To avoid the use of separate fastening elements such as safety pins and the like, belts of the type described are commonly provided with integral gripping or fastening elements with which the opposite ends of a conventional catamenial pad may be engaged. Although such integral fasteners offer convenient and rapid attachment, they are the source of possible discomfort and irritation. That is to say, such fasteners, during use, may bear locally with sufficient pressure as to cause discomfort and/or irritation after prolonged periods of time such as are normally encountered. Also, such fasteners are of material width or lateral dimensions so that they may not readily conform to natural body contours, this being particularly true of the posteriorly located fastener. It is, therefore, a primary object of this invention to provide means for overcoming such problems.

In addition to the above, it is a problem generally with belts of the type described that the same, being normally made of elastic, have a tendency to "curl" or "twist" during use and, as a result, they are very apt to give rise to discomfort from this source. It is, therefore, a further primary objective of this invention to provide means for preventing the deformation of belts as aforesaid.

More specifically, the present invention contemplates the provision of a slidable sheath or cover associated with fasteners as aforesaid so that the fasteners may be covered when the device is being worn. Specifically, such sheath or cover is preferably in the form of a soft, pliable material such as a synthetic resin product so as to cushion the aforesaid fasteners and any bulkiness in the regions thereof as occasioned by the attachment of the catamenial pad thereto.

A further objective of this invention is to provide a sheath or cover as aforesaid which is so constructed and arranged as to cooperatively associate itself with a belt of the type described so as to form an integral part thereof, offering no impediment to normal usage of the belt but providing, instead, an attachment therefor which renders the device more comfortable.

It is a further object of this invention to provide flexible and pliable sleeves on the body encircling portions of a belt of the type described so as to militate against the formation of body-irritating curls or twists in such body encircling portion of the belt and to, in general, provide greater comfort during use.

Other objects and advantages of the invention will appear from the description hereinbelow and the accompanying drawing wherein.

Figure 1:
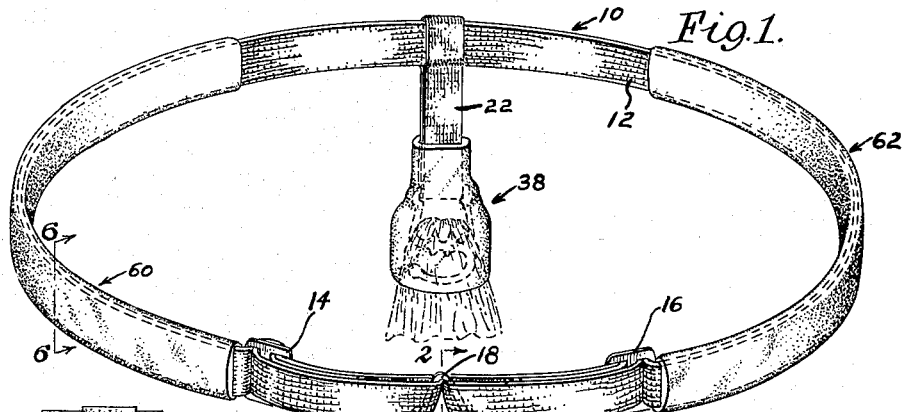
FIG. 1 is a perspective view of a belt assembly provided with the improvements according to the present invention.

Referring at this time more particularly to FIG. 1, the reference numeral 10 indicates in general a belt for supporting catamenial pads, the same including a body encircling portion 12 which, in the specific embodiment of belt shown, is divided into two sections, each of which is provided with a slack take-up buckle device as indicated by reference characters 14 and 16 and the two such sections being joined together by a triangular ring 18 which forms an anchoring means for the depending tab portion 20, a similar tab 22 being provided in diametrically opposed relationship to the tab portion 20 and which latter tab 22 may be directly attached to the belt body as by stitching or the like, all as is conventional in this art. It is to be understood that the belt may be constructed in any conventional and normal fashion, the details of which form no part of the present invention.

Figure 3:
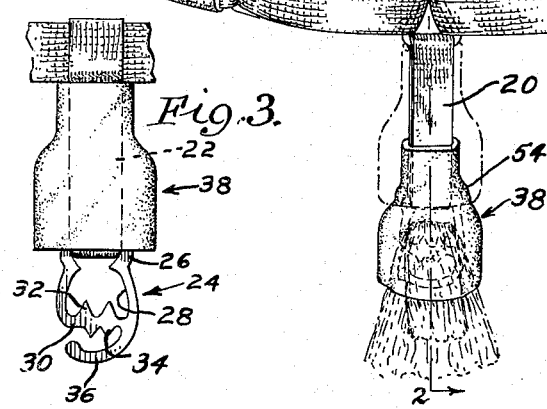
FIG. 3 is a front elevational view of one of the protective covers or sheaths showing the same in the out-of-the-way position.

As is shown most clearly in FIG. 3, each of the securing tabs 20 and 22 is provided at its lower end with a fastening device indicated generally by the reference character 24. This fastening device has a partially closed eye portion 26 at its upper end receiving the looped lower portion of the associated tab 20 or 22 and below this eye portion is a widened opening 28 defined in its lower end by the crossbar 30 which is provided with oppositely extending teeth 32 and 34 as shown, and the lower extremity of the fastener 24 is provided with a laterally curving retainer bar 36. The details of the fastener form no part of the present invention, suffice it to say that the fastener in normal usage receives the associated end of the catamenial pad assembly, the gauze extension passing first through the opening and thence over the crossbar 30 and back behind the retaining bar 36 so that the teeth 32 and 34 will effectively grip and hold the catamenial pad fixedly to the fastener.

Figure 2:
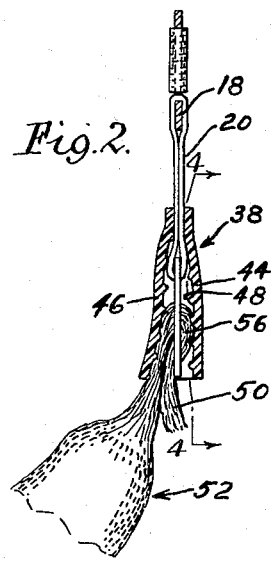
FIG. 2 is an enlarged vertical section taken substantially along the plane of section line 2—2 in FIG. 1 illustrating details of the present invention.
Figure 5:
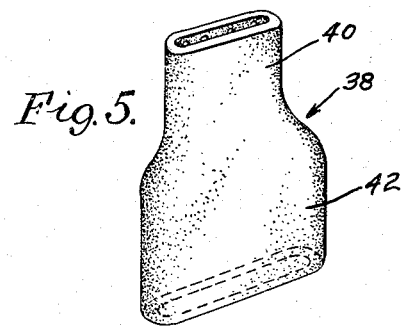
FIG. 5 is a perspective view of the one of the sheaths.
Figure 4:
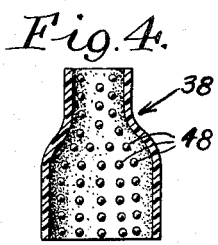
FIG. 4 is a sectional view taken through one of the protective sheaths as indicated by section line 4—4 in FIG. 2.

According to the present invention, each of the securing tabs 20 and 22 is provided with a slip fitted sheath or cover assembly indicated generally by the reference character 38. One of such assemblies is shown in detail in FIG. 5 wherein it will be seen that the upper end of each such sheath is provided with a necked down portion 40, the lower extremity of the sheath in each case being enlarged and indicated by the reference character 42. Thus, each sheath is, in front and rear elevation, of generally bell shaped form and being, in profile, of flat form as is shown best in FIG. 2. In FIG. 2, it will be manifest that the front and rear sides 44 and 46 of the sheath are provided with beads or knobs 48, see also FIG. 4, or the interior of the sheath in each is otherwise suitably roughened to provide a good gripping action. The purpose of this construction is to permit the narrower width neck portion 40 of each sheath 38 to engage its associated tab 20 or 22 with sufficient frictional force as to remain in position in which it is slid when the sheath in each case is disposed in the out-of-the-way position as illustrated in FIG. 3 for example or as illustrated in dotted lines for the anterior sheath 38 in FIG. 1. Additionally, when the gauze extension 50 of the catamenial pad 52, see particularly FIG. 2, is looped through the aforementioned opening 28 and back behind the retainer bar 36 as is shown in FIG. 2, the bulking of the material caused thereby affords an additional surface area against which the roughened interior of the lower or bell portion 42 of the sheath will engage so that the additional gripping effect afforded by such engagement will assure that the sheath, when operatively positioned as is shown in FIG. 2, will not inadvertently work upwardly to expose the fastener element 24. Thus, it will be appreciated that the bell portion 42 of the sheath is preferably of such internal dimensions laterally as to cooperate with the fastener 24 so that whereas it may be easily slid thereover, the bell bottom portion will also comfortably and easily engage over the bulk end of the associated pad and grippingly engage thereon to hold the sheath properly in position until it is purposely slid to the out-of-the-way position as shown in FIG. 3. Preferably, each sheath is made of a soft, pliable material, preferably a polyvinyl compound, the sheath in each case being sufficiently flexible to permit the same to be slid downwardly on the associated tab 20 or 22 to such an extent as to deform the area indicated by reference character 54 in FIG. 1 of the neck portion so that the same is grippingly engaged on the opposite sides of the fastener element 24. In this respect, it is to be noted that each fastener is of materially greater width than its associated attachment tab 20 or 22 to permit of this interengagement of parts. This further assures that the sheath in each case remains in the operative position without working loose therefrom and it is to be further noted that this deformation of the sheath will tend to close the fore and aft wall portions 44 and 46 more securely against the bulk mass as indicated at 56 in FIG. 2, the mechanism otherwise lying smoothly and in generally flat condition so as to conform readily with body contours. Thus, even though the sheath represents an enclosure for the fastener which is wider than the fastener, at the same time it presents soft and smoothly contoured envelope therefor so as to prevent any digging in of the fastener into the body of the user. Moreover, the greater area of the sheath in each case will tend to spread the pressure otherwise caused by the bunching at 56 over a greater surface area so that the pressure applied thereby will not become uncomfortable after prolonged use.

Figure 6:
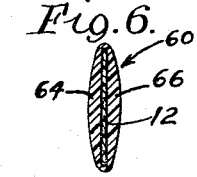
FIG. 6 is an enlarged vertical section taken through the body encircling portion of the belt as indicated by section line 6—6 in FIG. 1.

As is shown most clearly in FIG. 1, the diametrically opposed body encircling portions of the belt proper 12 are provided with sleeves indicated by reference characters 60 and 62, each of which is slip fitted upon and freely slidable along its body encircling portion of the belt and each of which is also preferably formed of material similar to that of the sheaths 38. The purpose of the sleeves 60 and 62 is to prevent the belt from twisting or curling and thereby representing an irritant to the user. That is to say, the belt is normally made of elastic which after some usage has a tendency to curl or twist which will create localized high pressure bearing areas against the user's body which are uncomfortable and annoying. Wherever this tendency occurs, should such tendency occur beyond the confines of the portion at which the sleeves 60 and 62 are positioned, they can be readily slid to cover or encompass the objectionable areas. However, at the same time, the very presence of the sleeves 60 and 62 will militate against the formation of the twists or curls in the first place. Still further, the soft, pliable nature of the material from which the sleeves 60 and 62 are made will in and of itself make the belt more comfortable for the wearer. FIG. 6 illustrates a sectional view showing the body encircling portion of the belt 12 and illustrating the manner in which the sleeve 60 for example encompasses and encloses the same, it being preferred that the inner and outer sides 64 and 66 of such sleeve be exteriorly rounded, the cross section of the sleeve in each case being generally ecliptical as shown.

It is to be understood that certain changes and modifications as illustrated and described may be made without departing from the spirit of the invention or the scope of the following claims.

What is claimed is:

1. A belt assembly comprising a body encircling belt having front, rear, and side portions, a pair of depending attachment tabs secured to said front and rear portions, fastener means on a free end of each tab adapted to secure an end of a catamenial pad to each tab, a sheath slidably mounted on each tab, each sheath composed of a soft, pliable and impervious plastic material, each sheath including a narrow upper portion snugly but slidably received on an associated tab and a relatively enlarged bottom portion adapted to enclose an associated fastener means and the end of the catamenial pad secured thereto, said upper portion of each sheath having a length substantially less than the length of its respective tab whereby the sheath may be moved up and down to selectively cover and uncover a fastening means, each of said sheaths having a smooth outer surface so as not to irritate the wearer of said belt assembly and a roughened inner surface for frictionally gripping one of the ends of said catamenial pad, said rear and side portions of said body encircling belt including a wide and relatively thin strap of substantially rectangular cross sectional shape, sleeve means slidably enclosing each of said side portions, said sleeve means composed of a material having substantially the same characteristics as the material comprising the sheath and being of a flattened oval cross sectional shape.

2. A belt assembly as defined in claim 1, wherein said material of the sheaths and sleeves is polyvinyl plastic and said roughened inner surface of the sheaths comprises a plurality of spaced knobs.

References Cited in the file of this patent

UNITED STATES PATENTS

| | | |
|---|---|---|
| 1,470,395 | Smith | Oct. 9, 1923 |
| 2,064,740 | Fontaine | Dec. 15, 1936 |
| 2,285,612 | Rehthaler | June 9, 1942 |
| 2,593,791 | Pitton | Apr. 22, 1953 |
| 2,691,984 | Zacks | Oct. 19, 1954 |
| 2,695,019 | Welter | Nov. 23, 1954 |